(12) United States Patent
Hatalsky

(10) Patent No.: US 6,577,776 B1
(45) Date of Patent: Jun. 10, 2003

(54) TRANSFORMING VIDEO IMAGES

(75) Inventor: Jeffrey F. Hatalsky, Framingham, MA (US)

(73) Assignee: Media 100, Inc., Marlboro, MA (US)

( * ) Notice: Subject to any disclaimer, the term of this patent is extended or adjusted under 35 U.S.C. 154(b) by 0 days.

(21) Appl. No.: 09/256,069

(22) Filed: Feb. 24, 1999

(51) Int. Cl.[7] .............................. G06K 9/36; G09G 5/00
(52) U.S. Cl. ................... 382/276; 365/189.01; 345/648
(58) Field of Search ............................... 382/276, 232, 382/205, 173, 254, 277, 282, 300, 296, 299; 365/189.01, 230.08, 230.01; 345/474, 648, 649, 672, 686

(56) References Cited

U.S. PATENT DOCUMENTS

| | | | | |
|---|---|---|---|---|
| 4,907,096 A | * | 3/1990 | Stansfield et al. | 358/456 |
| 5,070,465 A | * | 12/1991 | Kato et al. | 395/141 |
| 5,227,875 A | * | 7/1993 | Suu et al. | 358/133 |
| 5,561,721 A | | 10/1996 | Mutz | 382/205 |
| 5,777,628 A | * | 7/1998 | Buck-Gengler | 345/474 |
| 5,956,430 A | * | 9/1999 | Kunitake et al. | 382/246 |
| 6,016,152 A | | 1/2000 | Dickie | 345/436 |
| 6,031,785 A | | 2/2000 | Park et al. | 365/230.08 |
| 6,055,335 A | | 4/2000 | Ida et al. | 382/232 |
| 6,088,489 A | * | 7/2000 | Miyake | 382/299 |

OTHER PUBLICATIONS

PCT Written Opinion, dated Jan. 12, 2001.

* cited by examiner

*Primary Examiner*—Bhavesh M. Mehta
*Assistant Examiner*—Kanji Patel
(74) *Attorney, Agent, or Firm*—Fish & Richardson P.C.

(57) ABSTRACT

The invention provides a method for transforming pixels of a digital image by a preselected-transformation. The method includes acts for receiving pixel values of a selected pixel block from an original image provider; determining transformed pixel values for an image block of the selected pixel block under the transformation; and burst writing the transformed pixel values to a random access memory.

24 Claims, 9 Drawing Sheets

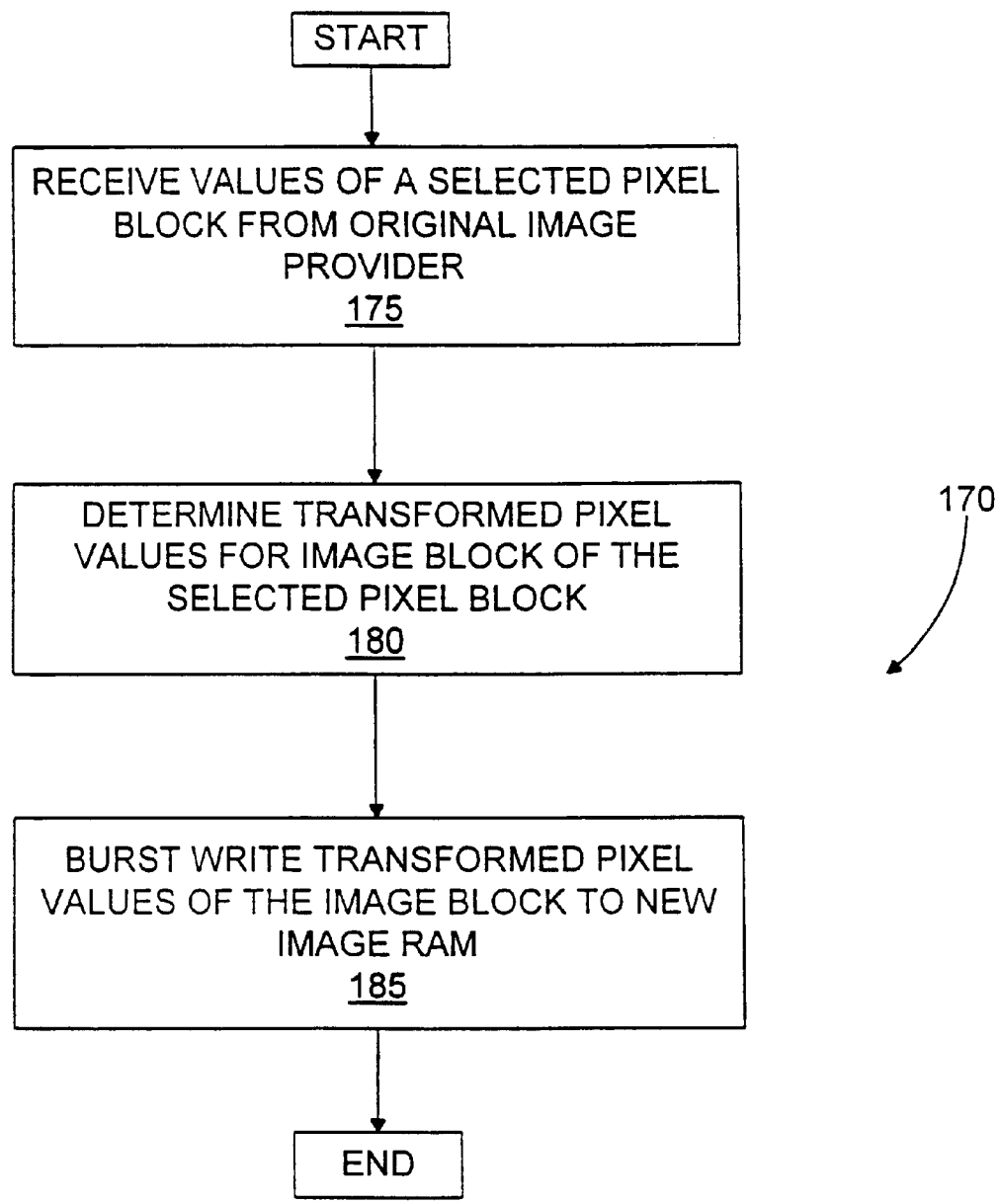

TRANSFORMING VIDEO IMAGES

BACKGROUND OF THE INVENTION

This invention generally relates to digital images, and more particularly, to transforming a video image and writing the transformed image to a random access memory.

Video programs represent individual images digitally with an ordered array of pixels. Each pixel has an associated value, e.g., three color intensities, that can be represented as a vector of binary digits. Often, the creation of a video program entails the manipulation or spatial transformation of an original digital image or portions thereof to produce a new digital image. The transformation uses the original values of the pixels to generate the new values of the pixels.

FIG. 1 illustrates the action of a spatial transformation on a Cartesian array of square pixels, e.g., the pixel P. The transformation includes a 2-dimensional (2D) translation and rotation. The transformation sends an original point X,Y into a new point X', Y' and sends an original pixel P into a square region R. Generally, such transformations do not conserve pixel boundaries. For example, the pixel P of the original image transforms to the region R, which overlaps several pixels $P_1$, $P_2$, $P_3$, $P_4$. Under a transformation, the image of a pixel can overlap several pixels.

Since the image of a pixel can overlap several pixels, one performs two steps to find the transformed value of a pixel. First, one finds which original pixels transform into an image pixel. Second, one interpolates the transformed value of the image pixel from original values of all of the pixels transforming thereto.

FIG. 2 shows a prior art system 10 for transforming a digital image. A first random access memory (RAM) 15 transmits the pixel values of the original image. A processor 20 couples to the first RAM 15 and can read pixel values therein. The processor 20 is adapted to determine the transformed pixel values from the original values stored in the first RAM 15. The processor 20 couples to a second RAM 25 and can write the transformed pixel values thereto. The second RAM 25 will store the new image resulting from the transformation.

FIG. 3 illustrates a method 40 for transforming a digital image with the system 10 of FIG. 2. At block 45, the processor 20 selects a pixel. At block 50, the processor 20 determines, which pixels transform to the selected pixel under the given transformation. At block 55, the processor 20 reads, from the first RAM 15, the original values of pixels, which transform to the selected pixel. At block 60, the processor 20 determines the transformed or new value of the selected pixel from the original values of the pixels transforming thereto. At block 65, the processor writes the new value of the selected pixel to the second RAM 25. At block 70, the processor 20 determines whether more pixels remain to be transformed. If more pixels remain, the processor 20 loops back to block 45 to select the next pixel to be transformed. After transforming all the pixels, the processor 20 stops.

Still referring to FIG. 3, the method 40 transforms the original image by processing pixels individually and sequentially. In particular, the reads of original pixel values from the first RAM 15, at block 55, and the writes of a new pixel value to the second RAM 25, at block 60, are both random memory accesses to the respective RAM's 15, 25. Random RAM accesses can be inefficient and slow processes, particularly for certain types of RAM's. The slowness of random memory accesses limits the speed at which one can transform images in video applications.

As an example, one can consider transforming a rectangular digital image composed of 480 horizontal lines having 720 pixels each. To transform at a standard rate of 60 frames per second, the processor 20 of FIG. 2 must write to the second RAM 25 at a rate of about 720×480×60 or $21 \times 10^6$ pixels per second. If each storage location of the second RAM 25 is large enough to store the bits for the value of one pixel, the processor 20 needs to perform about $21 \times 10^6$ writes per second for video applications. For a typical synchronous dynamic (SDRAM), a write uses about 6 clocks. Thus, the SDRAM must be able to receive data at a frequency of about $126 \times 10^6$ Hertz to achieve the standard operation speed. Since standard SDRAM's operate up to about $100 \times 10^6$ Hertz, standard SDRAM's are too slow to use random accesses for processing 720×480 pixel images. Prior art methods cannot transform large or high-resolution video images, at standard speeds.

One method for processing large or high-resolution images at standard speeds entails constructing the first and second RAM's 15, 25 of FIG. 2 with high speed RAM's. High-speed RAM is more expensive and uses more power. Furthermore, high-speed RAM is generally smaller and not adapted to handle large and high-resolution digital images.

SUMMARY OF THE INVENTION

In a first aspect, the invention provides a method for transforming pixels of a digital image by a preselected transformation. The method includes receiving pixel values of a selected pixel block; determining transformed pixel values for an image block of the selected pixel block under the transformation; and burst writing the transformed pixel values to a memory.

A burst write comprises a series of multiple-location memory writes to memory locations for the values of adjacent pixels.

In a further aspect, the invention provides an electronic apparatus for transforming the pixels of a digital image by a preselected transformation. The apparatus includes a processor and an output memory. The processor receives pixel values of a selected pixel block and determines transformed pixel values for an image block of the selected pixel block under the transformation. The processor then burst writes the transformed pixel values of the image block to the output memory.

In a further aspect, the invention provides a method of transforming a digital image with a transformation. The method includes separating the image into multi-pixel regions, selecting a multi-pixel region, transforming the pixels of the selected multi-pixel region to find image pixels thereof under the transformation. The multi-pixel regions are mutually exclusive. The method further includes determining transformed values for the image pixels, burst writing the transformed values to a random access memory (RAM), and then, repeating the acts of selecting, transforming, determining, and burst writing for a second multi-pixel region.

In a further aspect, the invention provides a method of spatially transforming a digital image. The method comprises dividing the digital image up into sub-image portions and processing each sub-image portion. The acts of processing each sub-image portion include storing pixel values for the pixels of the sub-image portion to a sub-image RAM, determining new pixel values for image pixels of the sub-image portions from said pixel values stored in said sub-image RAM, and burst writing the new pixel values to a second RAM at addresses corresponding to the image pixels. The sub-image RAM provides for high-speed random accesses. The second RAM supports first and second types of access commands. The second type of access command is faster than a series of the first type of commands, which produces the same final state. The burst writes to the second RAM include a series of said second type of access commands.

In a further aspect, the invention provides a program storage device readable by a machine and tangibly embodying a program of executable instructions for a method of transforming the pixels of a digital image under a preselected transformation. The method includes receiving pixel values of a selected pixel block from a first device; determining transformed pixel values for an image block associated with the selected pixel block under the transformation; and burst writing the transformed pixel values of the image block to an output memory.

Other advantages and features of the invention will be apparent from the following description of a preferred embodiment thereof and from the claims.

BRIEF DESCRIPTION OF THE DRAWINGS

FIG. 6A is a flow chart illustrating an embodiment of a method for transforming digital images with the system of FIG. 4;

DESCRIPTION OF THE SPECIFIC EMBODIMENTS

Figure 4:
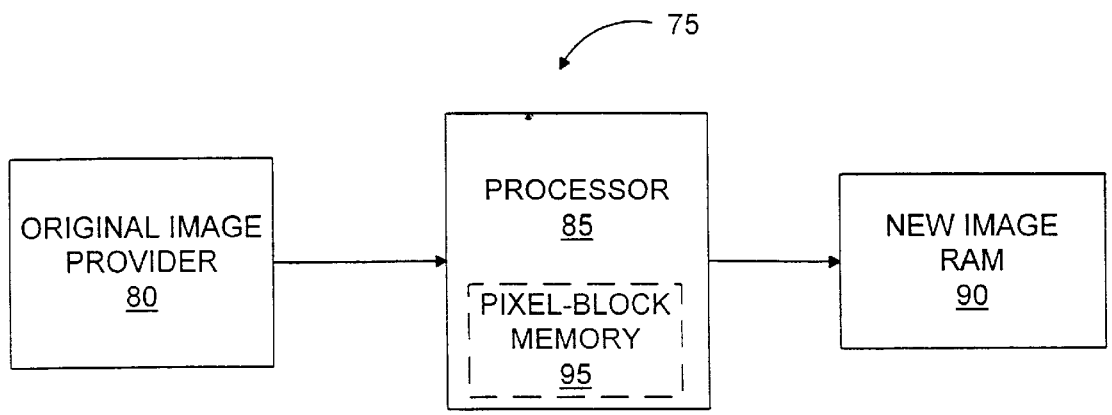
FIG. 4 is a high-level block diagram of one embodiment of a system for transforming digital images.
Figure 3:
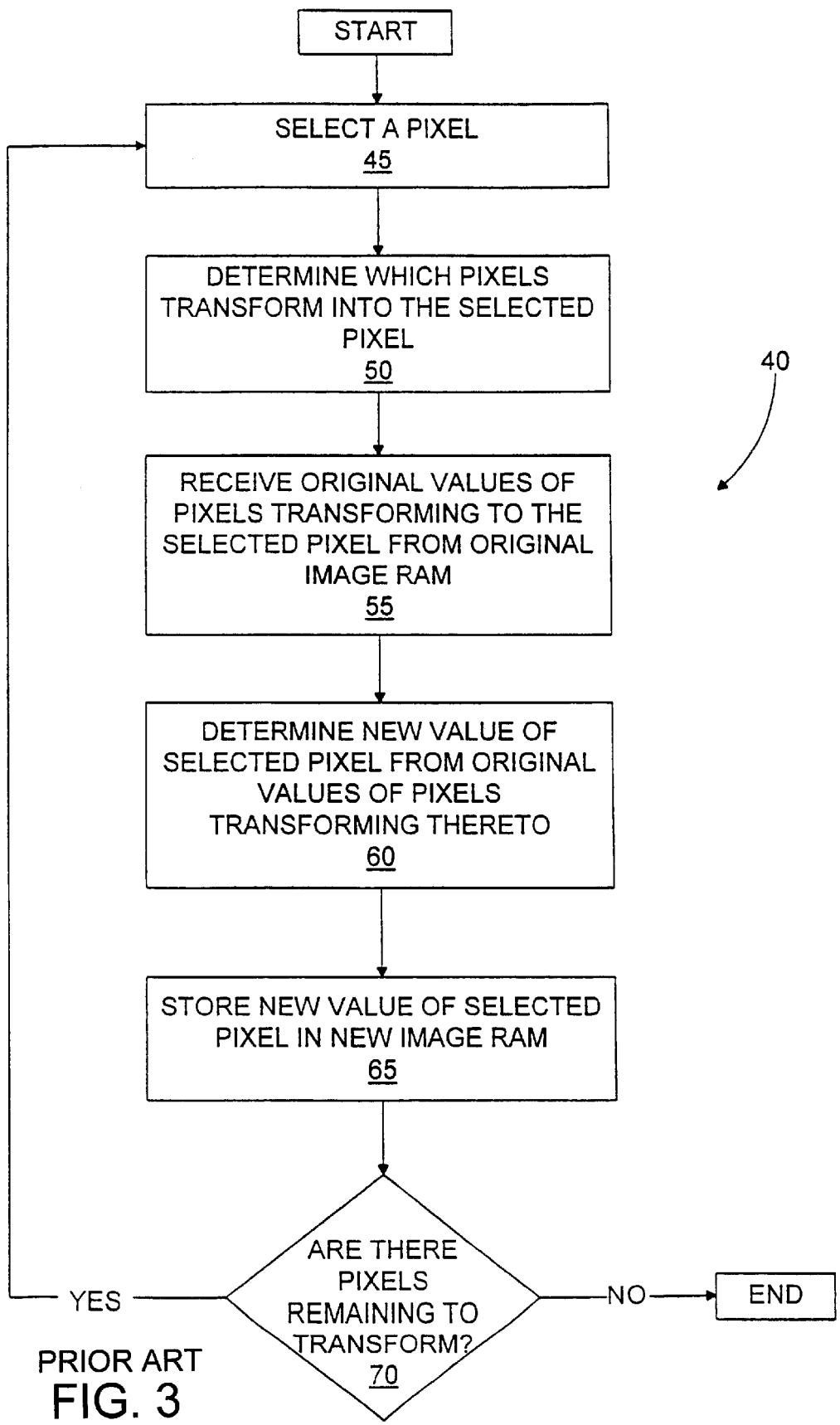
FIG. 3 is a flow chart illustrating a prior art method for transforming digital images with the system of FIG. 2.

FIG. 4 shows one embodiment of a system 75 for transforming a digital image. An original image provider 80 transmits or stores the array of pixel values of the original image. The original image provider 80 may be a data transmitter or cable, which transmits image data, or a data buffer or random access memory (RAM), which stores image data and from which stored data can be read. A new image RAM 90 will store the array of pixel values of the new image created by transforming the original image. The processor 85 receives blocks of original pixel values from the provider 80 and writes blocks of new pixel values to the RAM 90. The writes to the new image RAM 90 are block-by-block "burst" writes, which include a series of multiple-location memory writes. The memory locations of each write of the series correspond to adjacent groups of pixels. The processor 85 preferably includes an ASIC hardwired to carry out the functions described herein.

In the general case, it may not be necessary for the processor 85 to read or request data from the original image provider 80. Instead the provider 80 may automatically supply the pixel data.

The processor 85 includes a fast small RAM 95, i.e. a pixel-block memory or a sub-image RAM for a sub-image portion of the pixel array. The processor 85 uses the small memory 95 while generating the new or transformed pixel values for the image of each individual block of pixels. The processor 85 transforms the original image pixel block by pixel block.

Still referring to FIG. 4, the processor 85 is programmable to implement a variety of transformations defined by a planar quadrilateral to planar quadrilateral mapping as indicated by the following formula.

$$[x, y, 1] = [u, v, 1] * \begin{bmatrix} a_{11} a_{12} a_{13} \\ a_{21} a_{22} a_{23} \\ a_{31} a_{32} a_{33} \end{bmatrix}$$

where:

u and v are the original coordinate values, x and y are the transformed coordinate values, and $a_{11}$ to $a_{33}$ are coefficients defining the transformation.

For example, the processor 85 can perform combinations of 2-dimensional (2D) rotations and translations. The processor 85 can also perform more general transformations of an image or of a portion of an image.

Henceforth, the term "image" includes both images formed by an entire physical array of pixels and images formed by a portion of an entire physical array of pixels.

Still referring to FIG. 4, the provider 80 and the RAM 90 can have a variety of constructions. For example, they may both be inexpensive synchronous dynamic RAM's (SDRAM). A single memory location of the two RAM's could store all bit values for a single pixel. Then, a single memory access to one memory location reads or writes all bits of the value of the associated pixel.

The RAM 90 also supports multiple-location access commands. For example, the multiple location access may be an access to several adjacent column locations in a single memory row. A multiple-location access uses a single address select for all adjacent memory locations being accessed. The processor 85 performs burst accesses to, at least, RAM 90 by performing a series of multiple-location accesses. If the provider 80 is a RAM, the provider 80 may or may not support multiple-location accesses. If both the provider 80 and the RAM 90 support multiple-location accesses, the processor 85 performs burst accesses to either one by performing a series of multiple-location accesses.

Still referring to FIG. 4, the adjacent memory locations of a multiple-location access are pixels at adjacent locations along a preferred direction of the pixel array. A multiple-location access along the preferred direction proceeds more rapidly than a series of random accesses. The processor 85 performs a burst access for an image block by doing a series of multiple-location accesses along each column or row in the image block, depending upon which is the preferred direction. Each such multiple-location access to a column or row accesses adjacent groups of pixels. For example, if the preferred direction is along the rows, a burst access for a image block is a series of multiple-location accesses along each row (including columns in each row in the image block). To perform a burst access for an image block, the processor 85 only uses multiple-location accesses along the preferred direction of the image, because a RAM does not support multiple-location accesses for orthogonal directions. For example, a RAM supporting multiple-location accesses for adjacent column locations will not support multiple-location accesses to adjacent row locations. In the preferred embodiment described herein, the RAM 90 supports a multiple-location access along a row, i.e. for adjacent column addresses.

Figure 5:
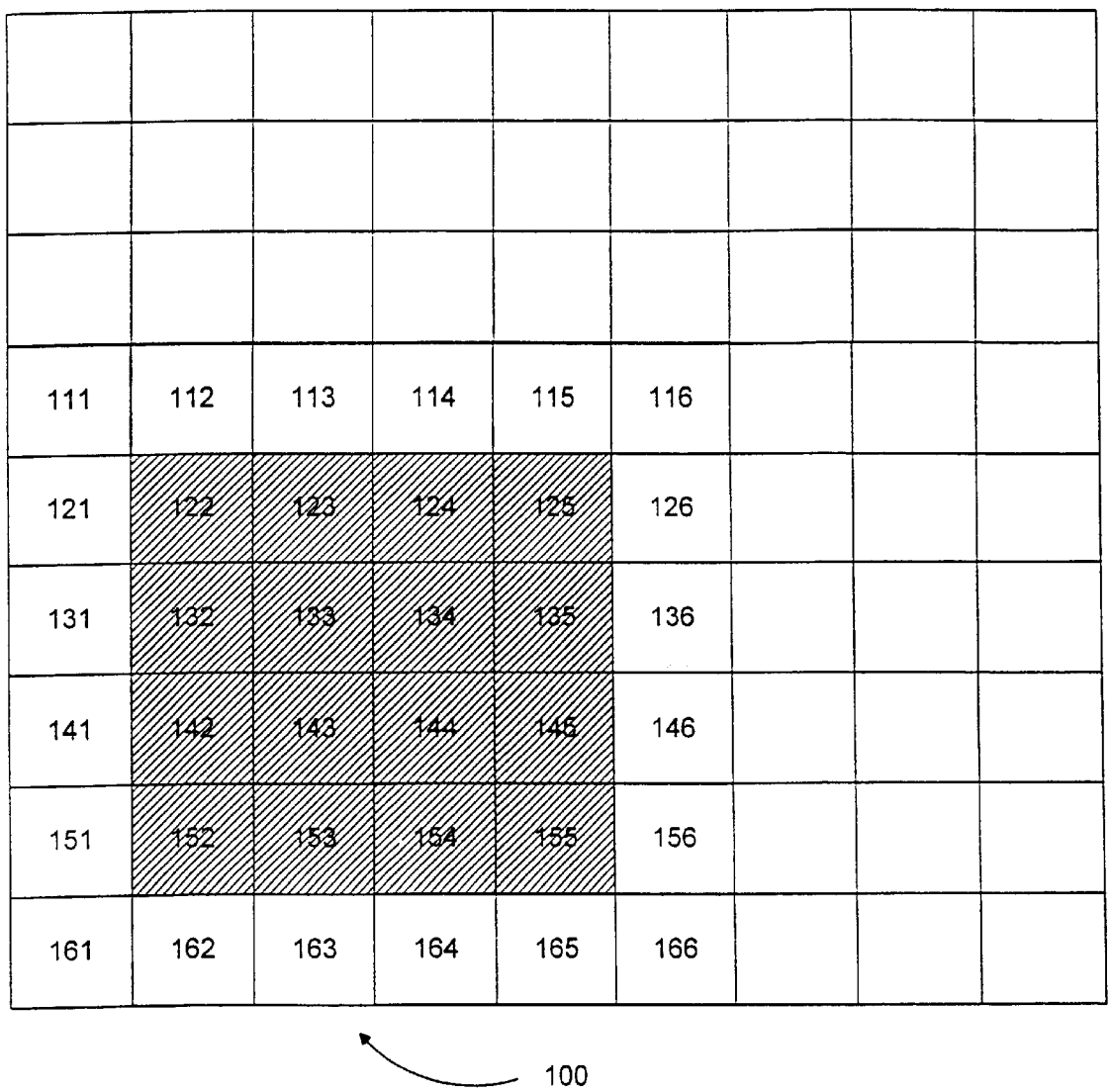
FIG. 5 shows a pixel array and an exemplary pixel block, which the system of FIG. 4 can transform.

FIG. 5 shows a pixel array 100 and an exemplary pixel block or sub-image region, which the system 75 of FIG. 4 can transform. The shaded pixels 122–125, 132–135, 142–145, 152–155 form the exemplary pixel block. Each pixel block has associated "guard pixels", which are located adjacent the boundary of the block. For the pixel block formed by the shaded pixels 122–125, 132–135, 142–145, 152–155, the associated guard pixels are pixels 111–116, 121, 126, 131, 136, 141, 146, 151, 156, 161–166. The processor 85 of FIG. 4 uses both the pixels and the associated guard pixels of a selected pixel block to construct the image block of the selected pixel block under a given transformation.

In other embodiments, pixel blocks may have different sizes and shapes, e.g., square regions of four, nine, etc. pixels or regions having one or several other shapes. Each pixel belongs to only one pixel block.

FIG. 6A is a flow chart illustrating one method 170 of transforming a digital image with the system 75 of FIG. 4. At block 175, the processor 85 receives pixel and guard pixel values for a selected pixel block from the provider 80. This may entail reading the provider 80, or the provider 80 may automatically transmit the pixel block. The processor 85 stores the pixel values to the fast internal pixel-block or sub-image memory 95. Subsequent processor manipulations employ the pixel values in the pixel-block memory 95—a high speed memory. At block 180, the processor 85 determines transformed pixel values for the pixels of an image block. The image block is the image of the selected pixel block under a preselected transformation. At block 185, the processor 85 burst writes the transformed pixel values of the image block from the internal pixel-block memory 95 to the second RAM 90, which will store the new image.

As noted above, each burst write of an image block is a series of multiple-location writes of each row of the image block to adjacent memory locations for storing pixels.

Figure 6B:
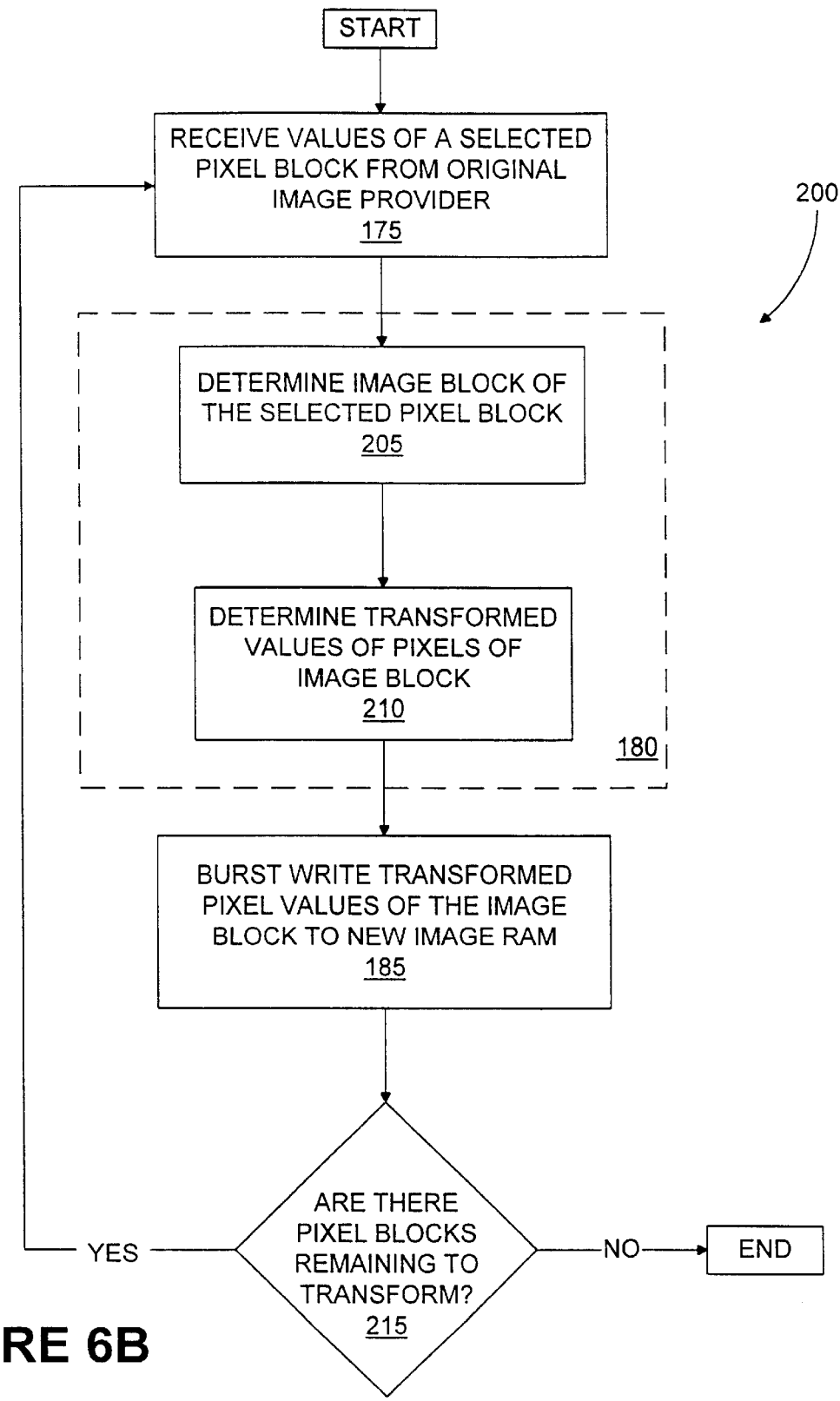
FIG. 6B is a flow chart illustrating a specific embodiment of the method of FIG. 6A.

FIG. 6B is a flow chart illustrating a specific embodiment 200 of the method 170 of FIG. 6A. Blocks 175 and 185 have been described in connection with FIG. 6A. At block 205, the processor 85 determines the image block of pixels to which the selected pixel block transforms, e.g., under the transformation shown for the pixel P in FIG. 1. At block 210, the processor 85 determines the transformed values of the pixels of the image block. At block 215, the processor 85 determines whether pixel blocks remain to transform. If pixel blocks remain, the processor 85 selects the next pixel block. The method 200 terminates after transforming all pixel blocks.

Figure 6C:
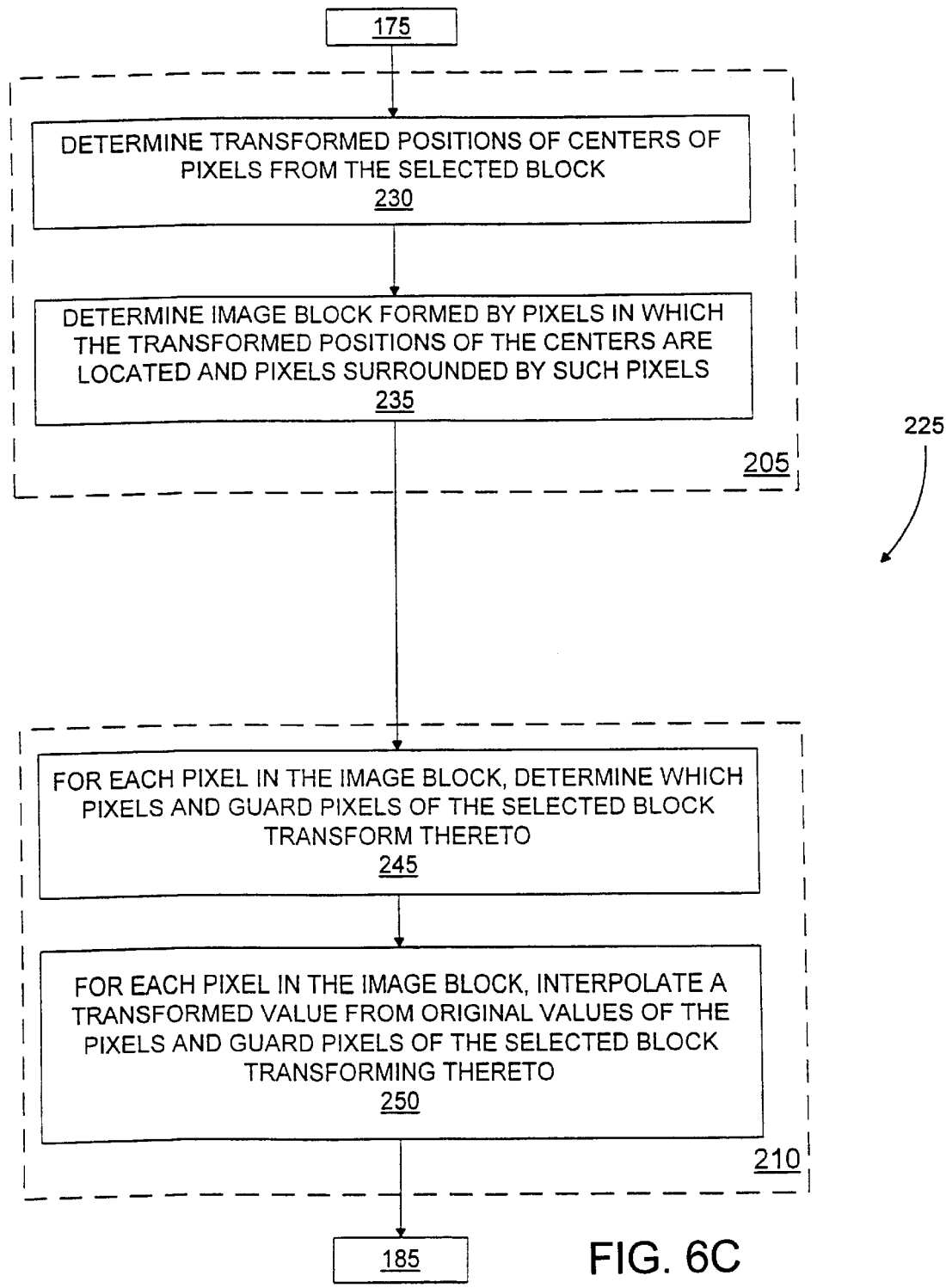
FIG. 6C is a flow chart illustrating one method of determining image blocks and the transformed values of pixels therein in the embodiment of FIG. 6B.

FIG. 6C is a flow chart illustrating one method 225 of determining the transformed values of the image block in FIG. 6B.

Block 205 determines the image block for the selected pixel block. At block 230, the processor 85 determines the transformed position of the center of each pixel of the selected pixel block. At block 235, the processor 85 determines which pixels belong to the image block of the selected pixel block. The pixels of the image block either contain one or more of the transformed centers of pixels of the selected block or are surrounded by other pixels of the image block. The image block may have a different shape than the selected pixel block as will be seen below.

Block 210 determines the transformed values of pixels of the image block from block 205. At block 245, the processor 85 determines which pixels and guard pixels of the selected pixel block transform into the individual pixels of the image block. For a chosen image pixel, these pixels include any original pixel whose center transforms therein and may also include pixels adjacent to these original pixels. The process of finding these pixels is effectively an "inverse transform" of the preselected transformation, and the pixels transforming into the chosen image pixel belong to an inverse transformation region. At block 250, the processor 85 interpolates the transformed value for the each pixel of the image block from the original values of the pixels and guard pixels transforming thereto. The interpolation may use a bi-cubic algorithm or another procedure for averaging the transformed pixel values known by persons of skill in the art in light of the present disclosure. Nearest neighbor (0 order) or linear (first order) interpolations could also be used instead of the bi-cubic (third order) interpolation.

Figure 1:
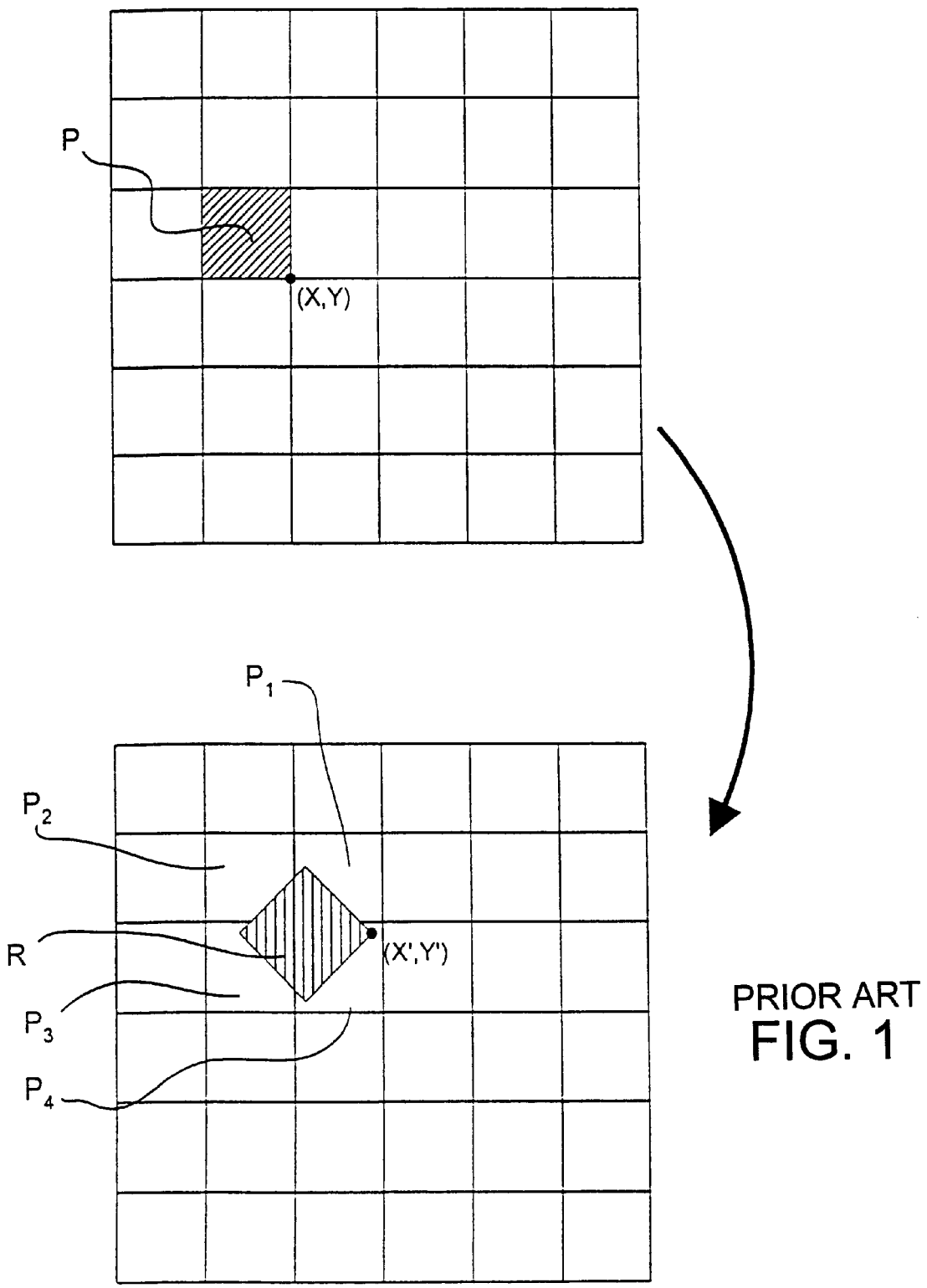
FIG. 1 illustrates the action of a transformation on one pixel of a digital image.
Figure 2:
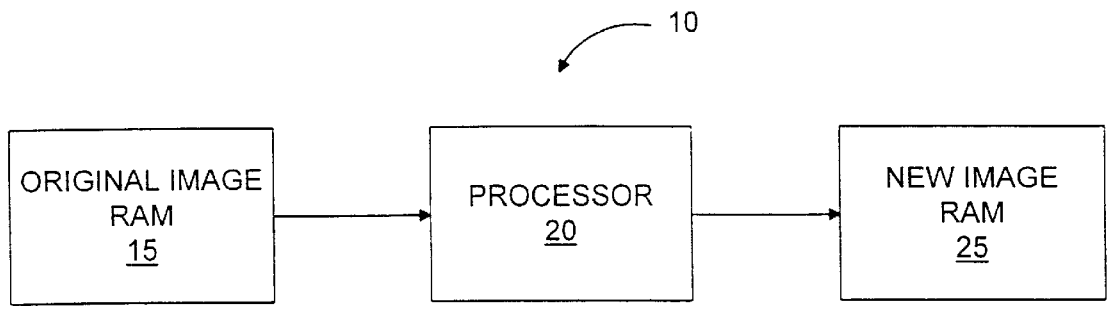
FIG. 2 is a high-level block diagram of a prior art system for transforming digital images.
Figure 7C:
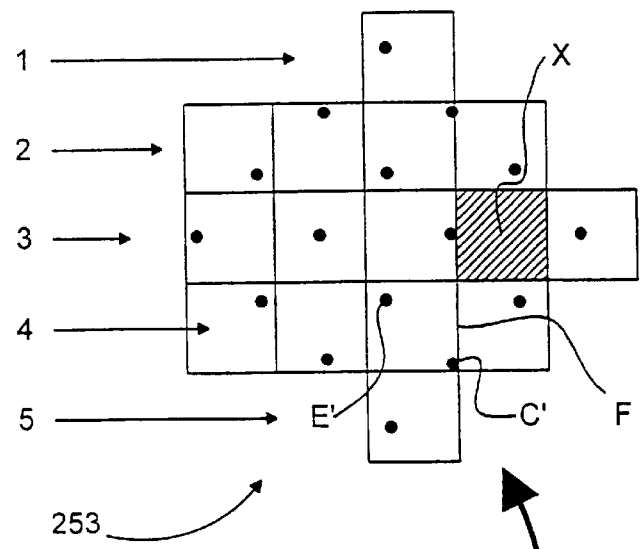
FIGS. 7A–7C illustrate the methods of FIGS. 6A, 6B, and 6C for the 45 degree rotation of FIG. 1.
Figures 7A, 7B:
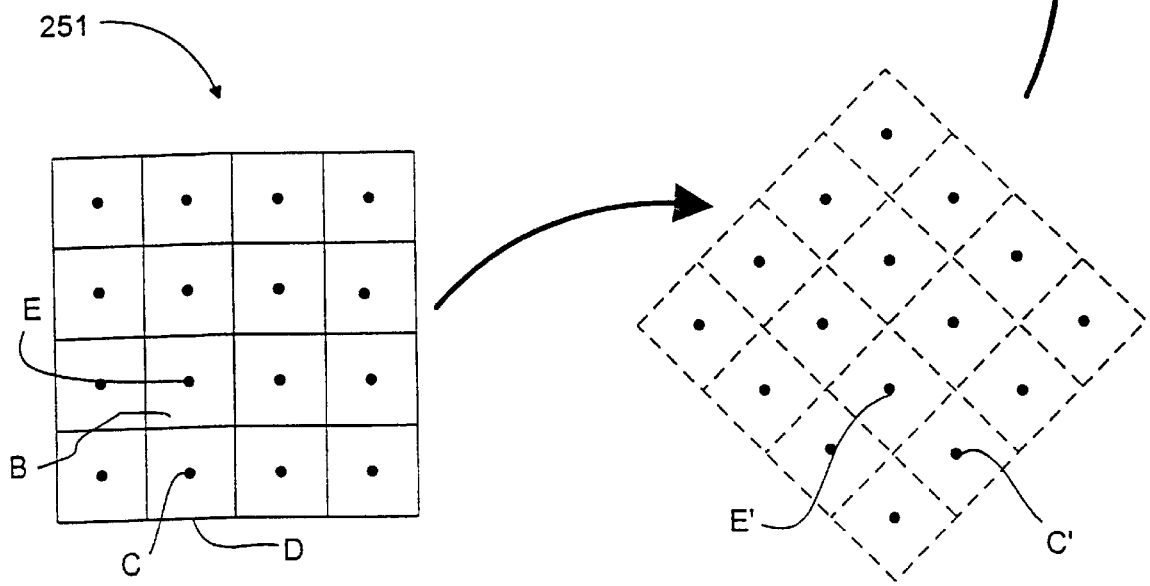

FIGS. 7A–7C illustrate the methods 170, 200, 225 of FIGS. 6A–6C for the combined translation and 45 degree rotation shown in FIG. 1. FIG. 7A shows the selected pixel block 251 and indicates the center of each pixel therein, e.g., the centers C, E of pixels D, B. FIG. 7B illustrates the result of transforming the centers of pixels of the selected block 251 as performed at block 230 of FIG. 6C. In particular, point C', E' are the images of the centers C, E of the pixels D, B. FIG. 7C illustrates the image block 253 constructed from the transformed locations of the centers of the pixels of the selected block 251. Each pixel of the image block 253 either contains, at least, one transformed center of a pixel of the selected block 251 or is surrounded by other pixels of the image block 253. For example, pixel F contains the transformed centers E', C', and pixel X is surrounded by other pixels of the image block 253.

FIGS. 7A and 7C also show how the method 225 performs the inverse transform, at block 245 of FIG. 6C, to determine which original pixels and guard pixels of the selected pixel block 251 transform into a chosen image pixel. The inverse transform of the pixel F of the image block 253 includes the pixels D, B. The inverse transform also includes any pixels and guard pixels of the selected block 251, which are directly adjacent pixels D, B and partially transform into the pixel F under the preselected transformation.

Finally, FIG. 7C shows that a burst write for the image block will successively store the values of pixels of rows 1, 2, 3, 4, 5 of the image block 253 to the new image RAM 90 by separate multiple-location write commands. Each write command will be for a horizontal row, because the preferred direction is the horizontal direction. Then, the burst write of block 185 of FIG. 6C consists of a series of five multiple-location writes of adjacent pixel values in each row, the multiple-location writes for the rows. For the image block 253, the multiple-location writes have respective lengths one, four, five, four, and one.

Referring to FIGS. 4–7C, all accesses of the RAM 90 have command (COM), address select, and data transfer steps. The COM step selects the type of access, i.e. random or multiple-location write or read. The address selection step entails a row address selection (RAS), a setup time pause (PAUSE), and a column address selection (CAS). A multiple-location access for a horizontal line takes the following form:

COM (N location read/write)
RAS (Row 1)
PAUSE
CAS (Col 1)
DATA Row 1, Col 1
DATA Row 1, Col 2
. . .
DATA Row 1, Col N Here, N is the length of the multiple-location access. The individual multiple-location access accesses data from adjacent columns in the same row. Since the RAS, PAUSE and CAS commands of the address selection steps use time, a multiple-column access can be substantially faster than a series of random accesses to the same memory locations. Moreover, the address selection (RAS, PAUSE, CAS) of a subsequent line can be performed during the data transfer (DATA, DATA . . . ) of the multiple-location access for the preceding line. This overlapping of multiple-location accesses tends to further reduce the time for data transfer.

Referring to FIGS. 7A–7C, both the selected and image blocks 251, 253 include a series of successive rows, wherein several rows have adjacent pixels. For the image block 253 shown in FIG. 7C, a burst write to the RAM 90 would have the following form:

COM(normal write)
RAS (Row 1)
PAUSE
CAS (Col 3)
DATA value of pixel of Row 1, Col 3
COM(4 location write)
RAS (Row 2)
PAUSE
CAS (Col 1)
DATA value of pixel of Row 2, Col 1
DATA value of pixel of Row 2, Col 2
DATA value of pixel of Row 2, Col 3
DATA value of pixel of Row 2, Col 4
COM(5 location write)
RAS (Row 3)
PAUSE
CAS (Col 1)
DATA value of pixel of Row 3, Col 1
DATA value of pixel of Row 3, Col 2
DATA value of pixel of Row 3, Col 3
DATA value of pixel of Row 3, Col 4
DATA value of pixel of Row 3, Col 5
COM(4 location write)
RAS (Row 4)
PAUSE
CAS (Col 1)
DATA value of pixel of Row 4, Col 1
DATA value of pixel of Row 4, Col 2
DATA value of pixel of Row 4, Col 3
DATA value of pixel of Row 4, Col 4
COM(normal write)
RAS (Row 5)
PAUSE
CAS (Col 3)
DATA value of pixel of Row 5, Col 3

Thus, a burst write for an image block is a series of several multiple-location accesses, each access corresponding to pixel values of one row of the image block 253.

Similarly, if the original image provider 80 of FIG. 4 is a RAM, the processor 85 may receive a block of pixel values through a burst read, which is a series of multiple-location reads. A burst read for the selected block 251, shown in FIGS. 7A and 6A, reads the pixel and the guard pixel values of the selected block 251 together. Thus, each of the multiple-location reads is for six adjacent pixel and guard pixel values per row, and the burst read is for a 6×6 block. Multiple-location reads are faster than a series of separate random reads to each pixel in the corresponding selected pixel blocks 251.

Referring to FIG. 4, other embodiments may use different definitions of a burst access. But, a burst access will generally be a series of memory accesses including, at least, one multiple-location access to memory locations for adjacent pixels.

In some embodiments, both receipts of selected pixel blocks 251 from the original image provider 80 and writes of transformed pixel blocks 253 to the new image RAM 90 employ burst accesses.

The use of an ASIC processor to perform both the transformation of a video image at high speed and the burst writing into a SDRAM is relatively inexpensive as compared with the use of high-speed RAMs for the output memory.

Figure 8:
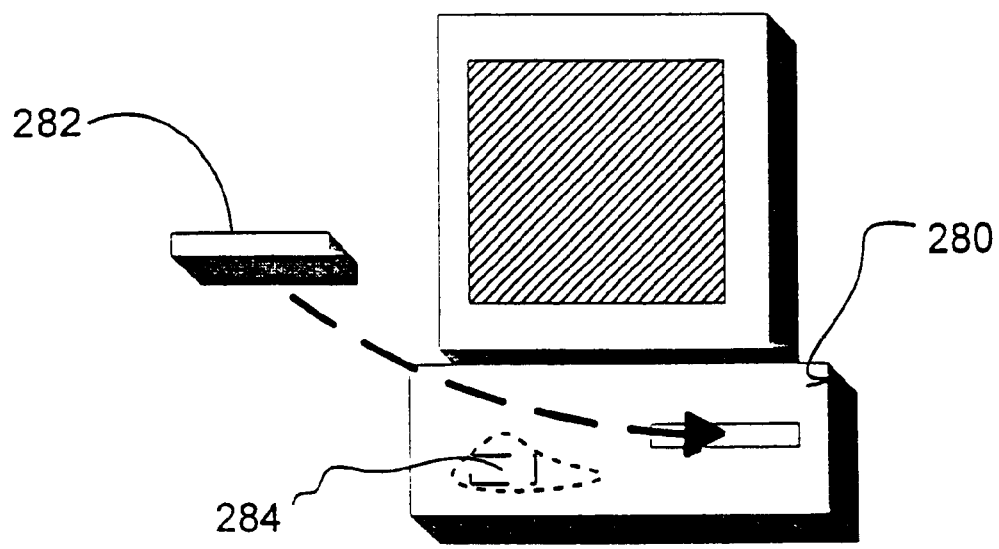
FIG. 8 illustrates a computer programmed by an executable program stored on a program storage device, the program having instructions for performing the methods of FIGS. 6A–6C.

FIG. 8 shows an alternative embodiment in which computer 280 has a program storage device 282 readable by the computer 280. The program storage device 282 may be a magnetic diskette, an optical disk, a magnetic tap or other media, known in the art. The program storage device tangibly encodes a program in a form executable by the computer. The program is executable by the computer 280 to perform one embodiment of the methods of 170, 200, 225 of. FIGS. 6A–6C. The computer 282 also includes a main memory 284, which may store the program for executing the methods 170, 200, 225 of FIGS. 6A–6C.

Specific embodiments have been shown by way of example in the drawings and detailed description. Nevertheless, the invention is susceptible to various modifications and alternate forms and is not to be limited to the particular forms disclosed above. Rather, the invention is to cover all modifications, equivalents, and alternates falling within the spirit and scope of the appended claims.

What is claimed is:

1. A method of transforming the pixels of a digital image by a preselected transformation, comprising:

operating on a pixel block by pixel block basis, each said pixel block including a plurality of pixels and corresponding to a portion of said digital image, such that, for each said pixel block, the following steps are carried out for one pixel block prior to acting on a further pixel block, receiving pixel values of a selected pixel block;

determining transformed pixel values for an image block of the selected pixel block under the transformation after said selected pixel block has been received; and burst writing the transformed pixel values of the image block to an output memory, wherein a burst write comprises a series of memory accesses, at least one of the memory accesses using a multi-location access command to access pixel values for adjacent pixels.

2. The method of claim 1, further comprising reading said pixel values for a selected pixel block from an input memory before said receiving.

3. The method of claim 1, wherein the act of receiving comprises receiving a combined block, the combined block consisting of the pixels of the selected block and the guard pixels of the selected block.

4. The method of claim 1, wherein the selected pixel block is a square block of pixels.

5. The method of claim 1, wherein the act of determining further comprises:
   determining an image block of the selected pixel block; and
   determining transformed values of the pixels of the image block.

6. The method of claim 5, wherein the act of determining an image block comprises:
   determining a transformed position for each center of a pixel of the selected block from the preselected transformation;
   determining the image block formed by image pixels, image pixels either including the transformed location of one of the centers or being surrounded by other image pixels.

7. The method of claim 5, wherein the act of determining transformed values of the pixels of the image block comprises:
   choosing a pixel of the image block;
   determining which pixels and guard pixels of the selected block transform into the chosen pixel; and
   interpolating a transformed pixel value for the chosen pixel from original pixel values of the pixels and the guard pixels of the selected block transforming into the chosen pixel.

8. The method of claim 7, wherein the act of interpolating includes employing a bi-cubic formula to determine the transformed pixel value from the original pixel values of the pixels and the guard pixels of the selected block transforming thereto.

9. The method of claim 1, further comprising repeating said acts of receiving, determining and burst writing for a second selected pixel block.

10. A method of transforming the pixels of a digital image by a preselected transformation, comprising:
   operating on a pixel block by pixel block basis, each said pixel block including a plurality of pixels and corresponding to a portion of said digital image, such that, for each said pixel block, the following steps are carried out for one pixel block prior to acting on a further pixel block,
   receiving pixel values of a selected pixel block;
   determining transformed pixel values for an image block of the selected pixel block under the transformation after said selected pixel block has been received; and
   burst writing the transformed pixel values of the image block to an output memory,
   wherein the selected pixel block is a square block of pixels,
   wherein the burst write comprises a series of multiple-location memory accesses, each multiple-location memory access being for memory locations of one row of pixels of the pixel block being written.

11. The method of claim 4, wherein the square pixel block comprises 16 pixels.

12. An electronic apparatus for transforming the pixels of a digital image by a preselected transformation, the apparatus comprising:
   a processor to receive pixel values of a selected pixel block including a plurality of pixels and to determine transformed pixel values for an image block of the selected pixel block under the transformation after said selected pixel block has been received, said processor operating on a pixel block by pixel block basis; and
   an output memory, said processor being adapted to burst write the transformed pixel values of the image block to said output memory,
   wherein said processor is adapted to perform a burst write by making a series of memory writes, at least one of the memory writes being a multi-location access for pixel values of adjacent pixels.

13. The apparatus of claim 12, further comprising an input memory storing said pixel values that are provided to and received at said processor.

14. The apparatus of claim 12, wherein said processor receives a combined block of pixels consisting of the pixels of the selected block and the guard pixels of the selected block.

15. The apparatus of claim 12, wherein said processor comprises dedicated hardwired logic circuitry.

16. The apparatus of claim 15, wherein said circuitry comprises an ASIC.

17. The apparatus of claim 12, wherein the processor determines an image block of the selected pixel block and determines transformed values of the pixels of the image block.

18. The apparatus of claim 17, wherein said processor determines the image block by
   determining transformed positions of the centers of the pixels of the selected block; and
   defining the image block of image pixels, each image pixel either containing one of the centers or being surrounded by other image pixels.

19. The apparatus of claim 19, wherein the processor determines transformed values of the pixels of the image block by
   choosing a pixel of the image block;
   determining which pixels and guard pixels of the selected block transform into the chosen pixel; and
   interpolating a transformed pixel value for the chosen pixel from original pixel values of the pixels and the guard pixels of the selected block transforming into the chosen pixel.

20. The apparatus of claim 12, wherein said processor is adapted to receive, determine, and burst write a plurality of selected pixel blocks separately.

21. A method of spatially transforming a digital image involving rotating and/or displacing all or part of a digital image, comprising:
   dividing said digital image up into sub-image portions, each said sub-image portion including a plurality of pixels; and
   processing each sub-image portion by carrying out the following steps for one sub-image portion prior to acting on a further sub-image portion,
   storing pixel values for the pixels of the sub-image portion to a sub-image RAM, said sub-image RAM providing high-speed random accesses;
   determining new pixel values for image pixels of said sub-image portion from said pixel values stored in said sub-image RAM, after the pixels of the sub-image portion have been stored such that the sub-image portion of said image described by said new values of said pixel block will be rotated and/or displaced; and
   burst writing said new pixel values to a second RAM at addresses corresponding to said image pixels, said second RAM supporting single-location and multiple-location access commands, said burst writing including a series of access commands with at least one multiple-location access command.

22. The method of claim 21, wherein said act of determining comprises transforming the locations of the pixels of said sub-image portion to transformed locations according to a preselected transformation.

23. The method of claim 22, wherein determining the new pixel values includes:

identifying the image pixels defined by transforming the sub-image portion;

performing an inverse transform to an inverse transformation region, pixels transforming to said image pixels belonging to the inverse transformation region; and determining new pixel values for said image pixels from chosen pixel values stored in said sub-image RAM, the chosen pixel values associated with the pixels of the inverse transformation region.

24. A method of transforming a digital image with a transformation, comprising:

separating the image into multi-pixel regions, the multi-pixel regions being mutually exclusive;

selecting a multi-pixel region;

transforming pixels of the selected multi-pixel region to find image pixels thereof under the transformation;

determining transformed values for said image pixels;

burst writing the transformed values to a random access memory (RAM); and then, repeating said acts of selecting, transforming determining, and burst writing for a second multi-pixel region, wherein said act of burst writing comprises:

separating the image pixels into a plurality of groups each group comprising adjacent pixels along a preferred direction; and performing a series of multiple-location writes to the RAM, each multiple-location write storing the pixel values of a separate one of the groups to the RAM.

* * * * *